United States Patent
Song et al.

(10) Patent No.: US 9,436,237 B2
(45) Date of Patent: Sep. 6, 2016

(54) HEAT DISSIPATION DEVICE

(71) Applicant: BEIJING BOE OPTOELECTRONICS TECHNOLOGY CO., LTD., Beijing (CN)

(72) Inventors: Yong Song, Beijing (CN); Junguo Liu, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 13/959,860

(22) Filed: Aug. 6, 2013

(65) Prior Publication Data
US 2014/0063713 A1    Mar. 6, 2014

(30) Foreign Application Priority Data

Aug. 29, 2012  (CN) .......................... 2012 1 0314166

(51) Int. Cl.
*G06F 1/20* (2006.01)
(52) U.S. Cl.
CPC .................... *G06F 1/203* (2013.01)
(58) Field of Classification Search
CPC ........................................................ G06F 1/20
USPC .................................................. 361/679.46
See application file for complete search history.

(56) References Cited

U.S. PATENT DOCUMENTS

| | | | |
|---|---|---|---|
| 5,329,829 A * | 7/1994 | Sell ................................. 74/553 |
| 7,701,709 B2 * | 4/2010 | Tomioka et al. ........ 361/679.47 |
| 2003/0218862 A1 * | 11/2003 | Dietrich et al. ............... 361/687 |
| 2007/0177350 A1 * | 8/2007 | Hata et al. ..................... 361/697 |
| 2011/0075352 A1 * | 3/2011 | Tye et al. ................. 361/679.46 |
| 2011/0103005 A1 * | 5/2011 | Neumann et al. ....... 361/679.46 |

FOREIGN PATENT DOCUMENTS

| | | |
|---|---|---|
| CN | 102480905 A | 5/2012 |
| CN | 202275351 U | 6/2012 |

OTHER PUBLICATIONS

Extended European Search Report dated Aug. 27, 2014; Appln. No. 13179838.1-1959/2703942.
European Patent Office Communication Appln. No. 13 179 838.1-1959; Dated Sep. 24, 2015.
First Chinese Office Action dated Apr. 5, 2016; Appln. No. 201210314166.1.

* cited by examiner

*Primary Examiner* — Forrest M Phillips
(74) *Attorney, Agent, or Firm* — Ladas & Parry LLP

(57) ABSTRACT

Embodiments of the present invention provide a heat dissipation device of a notebook computer. The notebook computer is provided with a keyboard. The heat dissipation device includes a heat dissipation component and a heat guiding box, the heat dissipation component is communicated with the heat guiding box, the keyboard is also communicated with the heat guiding box, and the heat guiding box is used to transmit heat in the heat dissipation component to the keyboard.

11 Claims, 5 Drawing Sheets

HEAT DISSIPATION DEVICE

TECHNICAL FIELD

Embodiments of the present invention relate to a heat dissipation device of a notebook computer.

BACKGROUND

FIG. 1 is a schematic view of a conventional heat dissipation device of a notebook computer. Referring to FIG. 1, heat generating elements in the notebook computer 20 mainly includes a graphics card 2 and CPU (central processing unit.) 1. The heat generated in the graphics card 2 and CPU 1 is transmitted to a radiator 4 in a heat dissipation component 21 by a heat guiding pipe 3, and then is blown out of the radiator 4 by a fan 5 in the heat dissipation component 21, so that the heat in the notebook computer 20 is dissipated.

The above mentioned heat dissipation device has the following problems: the heat in the notebook computer 20 is not recycled but is discharged directly, resulting in waste of the heat energy. In addition, for the on-site worker using the notebook computer 20 outdoors, his hands are prone to be frozen stiff or even be frostbit when he operates a keyboard 6 at a low ambient temperature.

SUMMARY OF THE INVENTION

According to an embodiment of the present invention, a heat dissipation device of a notebook computer is provided. The heat dissipation device includes a heat dissipation component and a heat guiding box, the heat dissipation component is communicated with the heat guiding box, the keyboard is also communicated with the heat guiding box, and the heat guiding box is used to transmit heat in the heat dissipation component to the keyboard.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
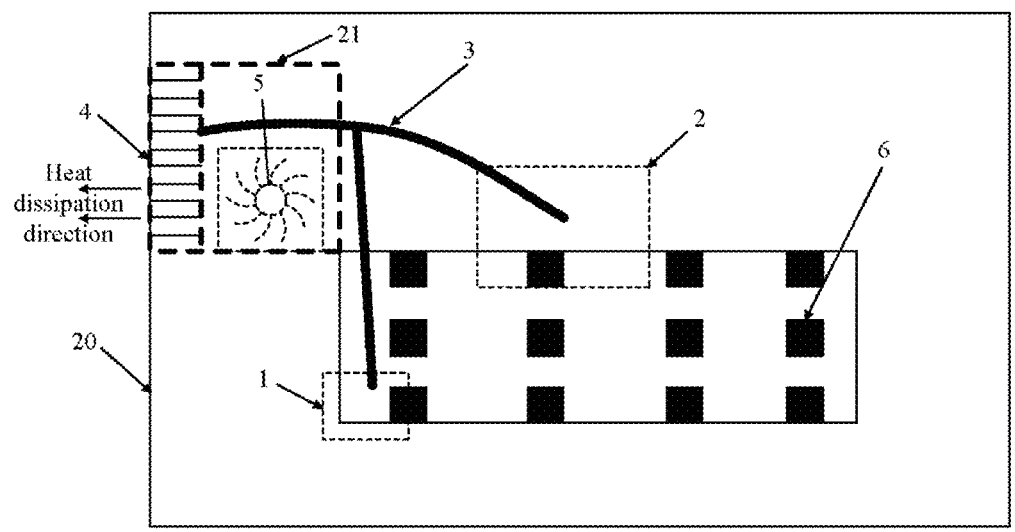
FIG. 1 is a schematic view of a conventional heat dissipation device of a notebook computer.
Figure 2:
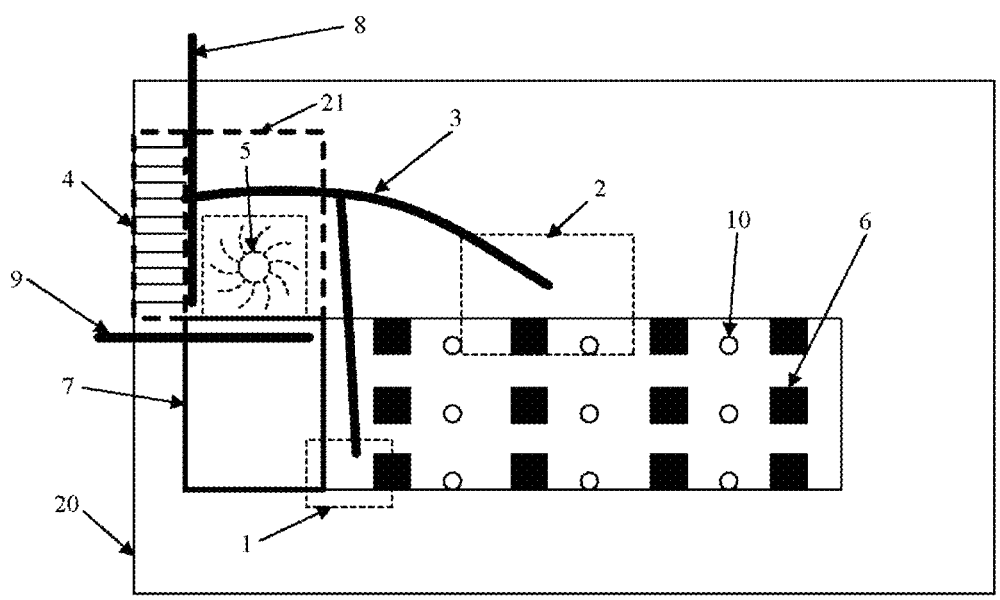
FIG. 2 is a schematic view of a heat dissipation device of a notebook computer according to an embodiment of the present invention.

An embodiment of the present invention provides a heat dissipation device of a notebook computer 20, and the notebook computer 20 is provided with a keyboard 6. FIG. 2 is a schematic view of the heat dissipation device of the notebook computer according to the embodiment of the present invention. As shown in FIG. 2, the heat dissipation device includes a heat dissipation component 21 and a heat guiding box 7, the heat dissipation component 21 includes a heat guiding pipe 3, a radiator 4, and a fan 5, the heat guiding box 7 is connected between the heat dissipation component 21 and the keyboard 6, and the heat guiding box 7 is capable of transmitting the heat in the heat dissipation component 21 to the keyboard 6.

Further referring to FIG. 2, after the heat generated in a graphics card 2 and a CPU 1 of the notebook computer 20 is transmitted to the heat dissipation component 21 by the heat guiding pipe 3, the heat enters into the inside of the keyboard 6 through the heat guiding box 7, so that the temperature of the keyboard 6 is increased. In this manner, the heat generated in the notebook computer 20 can be recycled effectively instead of being discharged directly, and thus waste of the heat energy can be avoided. In addition, when the on-site worker using the notebook computer 20 outdoors operates the keyboard 6 at low ambient temperature, his hands can receive the heat from the keyboard 6, and thus the case in which his hands are frozen stiff or even is frostbit can be avoided.

The inner wall of the heat guiding box 7 may be coated with a heat insulating material, so as to reduce the loss of heat during the transmitting process. One or more heat dissipation holes 10 may be provided on the keyboard 6.

When the keyboard 6 is provided with the heat dissipation holes 10, the heat is discharged through the heat dissipation holes 10, which is advantageous to the hands warmth of the on-site worker using the notebook computer 20 outdoors. Each of the heat dissipation holes 10 may have a circle shape, a rectangular shape, a triangle shape, or other suitable shapes.

Figure 3:
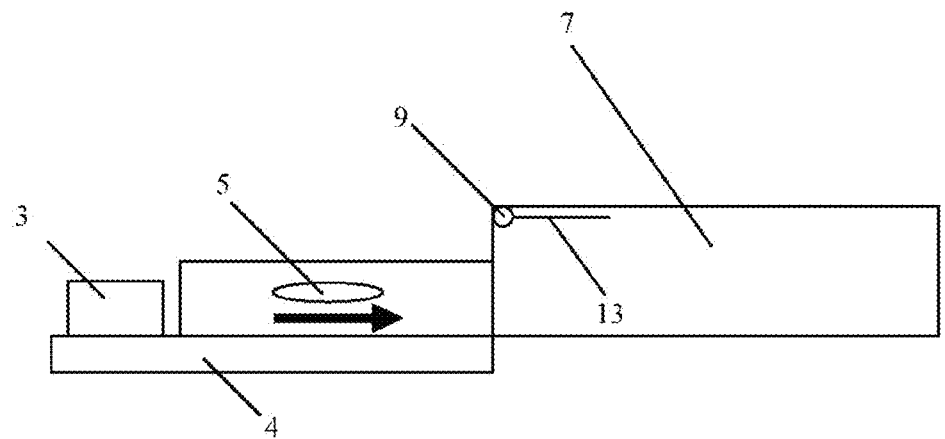
FIG. 3 and FIG. 4 are schematic views of controlling of the close and open of a heat transmitting path between a heat dissipation component and a keyboard by a first control structure and a first valve in the heat dissipation device according to the embodiment of the present invention.
Figure 4:
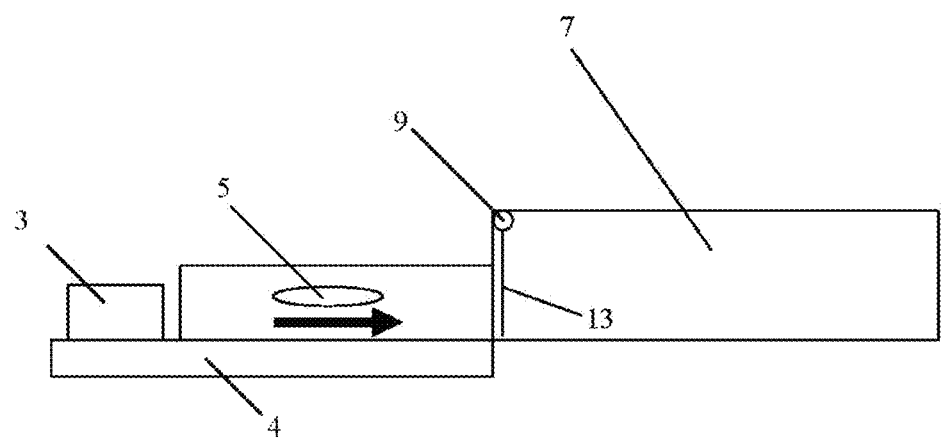

A first control structure 9 which is rotatable and a first valve 13 may be provided in the heat guiding box 7, so as to control the close and open of the heat transmitting path between the heat dissipation component 21 and the keyboard 6. The first control structure 9 is connected with the first valve 13 to control the first valve 13. When the ambient temperature is not low enough to harm the hands of the on-site worker using the notebook computer 20 outdoors, the heat transmitting path between the heat dissipation component 21 and the keyboard 6 is closed by the first control structure 9 and the first valve 13, as shown in FIG. 4. When the ambient temperature is low enough, the heat transmitting path between the heat dissipation component 21 and the keyboard 6 is opened by the first control structure 9 and the first valve 13 so that the heat is transmitted to the keyboard 6, as shown in FIG. 3.

As shown in FIG. 2, the first control structure 9 may be extended out of the notebook computer 20 by about 0.5 cm to 2 cm (for example, 1 cm), so that the first control structure 9 can be rotated manually or electrically.

Figure 5:
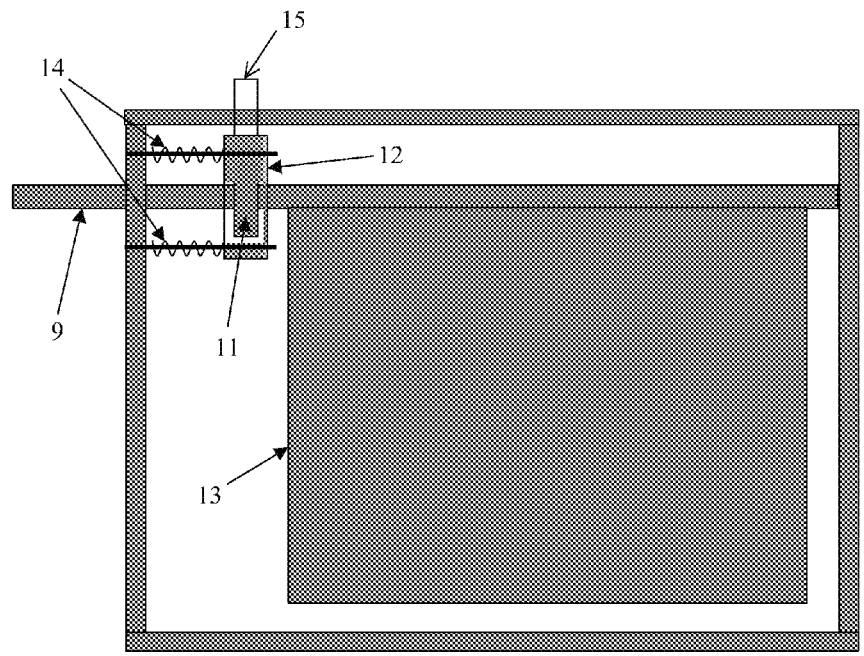
FIG. 5 and FIG. 6 are schematic views of controlling of the first valve by the first control structure in the heat dissipation device according to the embodiment of the present invention.
Figure 6:
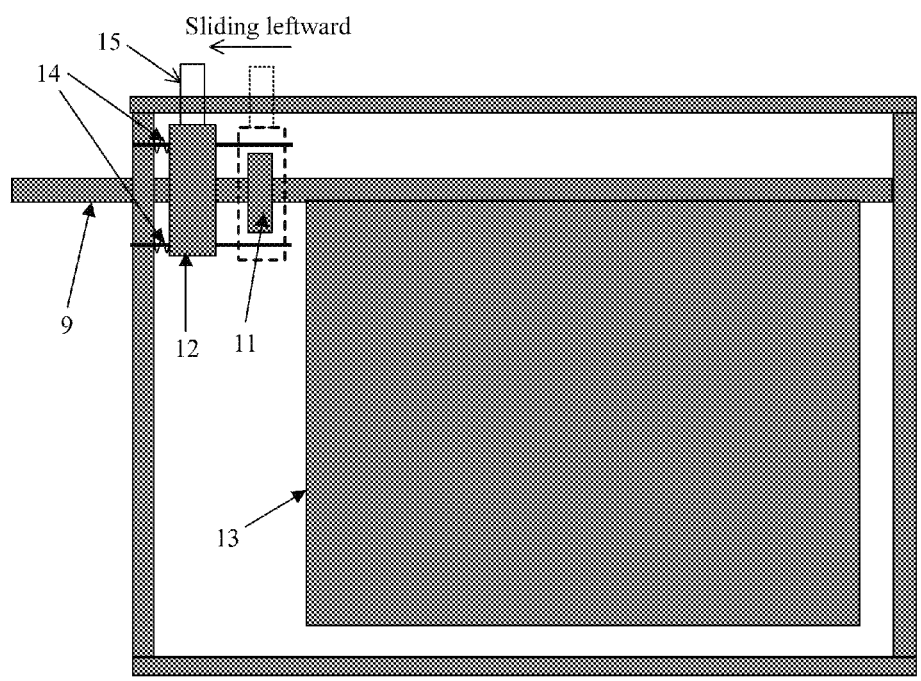

In order to ensure the control of the first valve 13 by the first control structure 9, a configuration shown in FIG. 5 and FIG. 6 may be employed. In FIG. 5 and FIG. 6, the first control structure 9 includes a central shaft 11 and an outer wheel 12, the central shaft 11 is fixed on the first control structure 9, and the outer wheel 12 is fitted over the central shaft 11. Fixing elements capable of engaging with each other are provided on the outer wheel 12 and the central shaft 11, so that the central shaft 11 and the outer wheel 12 are capable of being fixed with each other as shown in FIG. 5. For example, the fixing elements may include a protrusion provided on the central shaft 11 and a groove provided on the outer wheel 12, and the protrusion and the groove are capable engaging with each other. Of course, the fixing elements may also include a protrusion provided on the outer wheel 12 and a groove provided on the central shaft 11, and the protrusion and the groove are capable of engaging with each other.

The outer wheel 12 may be connected with a slide 15 extending out of the notebook computer 20. The outer wheel 12 is disengaged with the central shaft 11 when the slide 15 slides leftward, as shown in FIG. 6. In this case, the central shaft 11 rotates freely for the central shaft 11 and the outer wheel 12 are disengaged with each other, the first valve 13 naturally droops due to the gravity as long as no external forces are applied, and thereby the heat transmitting path between the heat dissipation component 21 and the keyboard 6 is closed. After the slide 15 is released, the outer wheel 12 is returned to fit over the central shaft 11 due to the push of the spring 14, and is engaged with the central shaft 11 again.

Figure 7:
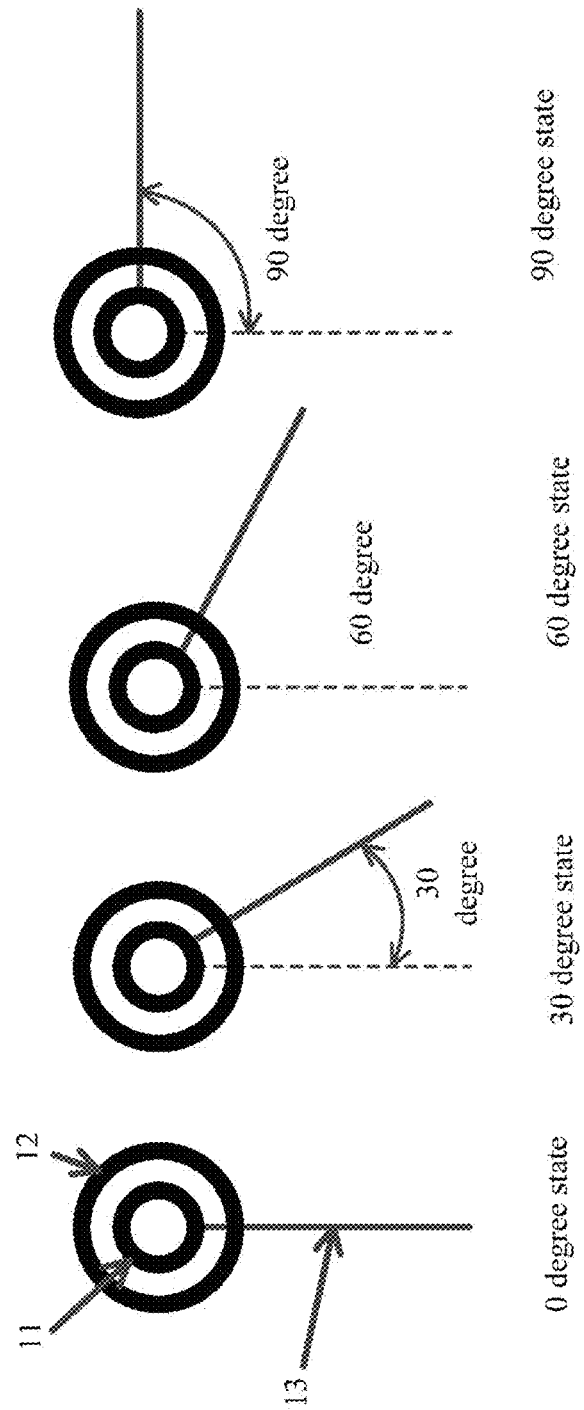
FIG. 7 is schematic view of controlling of the first valve by the first control structure in the heat dissipation device according to the embodiment of the present invention.

In addition, after the outer wheel 12 and the central shaft 11 are disengaged with each other, the first control structure 9 may also be rotated manually so that the first valve 13 is opened with different angles (for example, 0 degree, 30 degrees, 60 degrees, 90 degrees and so on), as shown in FIG. 7. Thereafter, the slide 15 is released, the outer wheel 12 is returned to fit over the central shaft 11 due to the push of the spring 14, and is engaged with the central shaft 11 again. By controlling the first valve 13 to be opened with different angles, the opening of the heat transmitting path between the heat dissipation component 21 and the keyboard 6 can have different sizes are, and thereby the amount of the heat provided for the keyboard 6 can be controlled.

It is also possible that the spring 14 is omitted, and the slide 15 is moved manually.

In addition, the heat dissipation component 21 may also be provided with a second control structure 8 between the radiator 4 and the fan 5, so as to control the close or open of the heat transmitting path between the radiator 4 and the fan 5. For example, when the heat transmitting path between the heat dissipation component 21 and the keyboard 6 is opened, the second control structure 8 and a second valve connected to the second control structure 8 are controlled to close the heat transmitting path between the radiator 4 and the fan 5, so that the heat dissipation by the fan 5 is reduced and the heat is provided to the keyboard 6 as much as possible. On the other hand, when the heat transmitting path between the heat dissipation component 21 and the keyboard 6 is closed, the second control structure 8 and the second valve connected to the second control structure 8 are controlled to open the heat transmitting path between the radiator 4 and the fan 5, so that the heat is dissipated by the fan 5 as much as possible without the necessary to provide the heat to the keyboard 6.

The configuration and operation principle of the second control structure 8 are same to those of the first control structure 9, and thus their detail descriptions are omitted here for simplicity.

Figure 8:
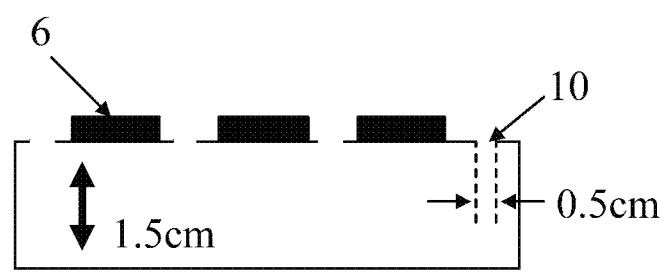
FIG. 8 is a schematic view of heat dissipation holes provided on the keyboard according to the embodiment of the present invention.

When the keyboard 6 is provided with heat dissipation holes 10, the diameter of each heat dissipation hole 10 may be 0.5 cm, as shown in FIG. 8. A filter may be further provided on each heat dissipation hole 10, so as to prevent the dust from entering. In addition, the height of the chamber of the keyboard 6 may be set as 1.5 cm.

The heat dissipation device according to the embodiments of the present invention changes the heat dissipation manner of the conventional notebook computer, and is capable of guiding the heat generated by the graphics card and the CPU to the keyboard, so that the heat generated in the notebook computer can be recycled effectively instead of being discharged directly and the waste of the heat energy can be avoided. Furthermore, the heat dissipation device according to the embodiments of the present invention is capable of taking full advantage of the heat generated by the notebook computer while increasing the heat dissipation, so that the case in which the hands of the on-site worker using the notebook computer outdoors are prone to be frozen stiff or even be frostbit can be avoided.

The foregoing embodiments merely are exemplary embodiments of the invention, and not intended to define the scope of the invention, and the scope of the invention is determined by the appended claims.

What is claimed is:

1. A heat dissipation device, provided in a notebook computer with a keyboard, wherein the heat dissipation device includes a heat dissipation component and a heat guiding box, the heat dissipation component is communicated with the heat guiding box, the keyboard is also communicated with the heat guiding box, and the heat guiding box is used to transmit heat in the heat dissipation component to the keyboard, the heat dissipation component includes a heat guiding pipe, a fan, and a radiator, heat generated in the notebook computer is transmitted to the heat dissipation component by the heat guiding pipe and then is blown out of the heat dissipation component by the fan, and the heat dissipation component further includes a second valve provided between the radiator and the fan, and the second valve its used for closing or opening a heat dissipation path between the heat dissipation component and external environment.

2. The heat dissipation device according to claim 1, wherein the heat guiding box includes a first valve for closing or opening a heat transmitting path between the heat dissipation component and the keyboard.

3. The heat dissipation device according to claim 2, wherein the heat guiding box further includes a first control structure which is rotatable, the first control structure is connected with the first valve to control the first valve.

4. The heat dissipation device according to claim 3, wherein the first control structure is extended out of the notebook computer.

5. The heat dissipation device according to claim 4, wherein the first control structure includes a central shaft and an outer wheel, the central shaft is fixed on the first control structure, the outer wheel is fitted over the central shaft, and fixing elements are provided on the outer wheel and the central shaft so that the central shaft and the outer wheel are capable of being fixed with each other.

6. The heat dissipation device according to claim 5, wherein the fixing elements includes:
a protrusion provided on the central shaft and a groove provided on the outer wheel, the protrusion and the groove being capable of engaging with each other, or
a protrusion provided on the outer wheel and a groove provided on the central shaft, the protrusion and the groove being capable of engaging with each other.

7. The heat dissipation device according to claim 5, wherein the outer wheel is connected with a slide extending out of the notebook computer.

8. The heat dissipation device according to claim 1, wherein the keyboard is further provided with a plurality of heat dissipation holes.

9. The heat dissipation device according to claim 1, wherein the heat dissipation component further includes a second control structure which is rotatable, and the second control structure is connected with the second valve to control the second valve.

10. The heat dissipation device according to claim 9, wherein the second control structure is extended out of the notebook computer.

11. The heat dissipation device according to claim 9, wherein each of the heat dissipation holes has a circle shape, a rectangular shape, or a triangle shape.

* * * * *